(12) United States Patent
Maas et al.

(10) Patent No.: US 10,329,421 B2
(45) Date of Patent: Jun. 25, 2019

(54) POLYCARBONATE COMPOSITIONS, METHOD OF MANUFACTURE THEREOF, AND ARTICLES THEREFROM

(71) Applicant: SABIC GLOBAL TECHNOLOGIES B.V., Bergen op Zoom (NL)

(72) Inventors: Christianus Johannes Jacobus Maas, Zeeland (NL); Sjoerd van Nispen, Oudenbosh (NL); Wilhelmus Johannes Daniel Steendam, Bergen op Zoom (NL)

(73) Assignee: SABIC GLOBAL TECHNOLOGIES B.V., Bergen OP Zoom (NL)

( * ) Notice: Subject to any disclaimer, the term of this patent is extended or adjusted under 35 U.S.C. 154(b) by 0 days.

(21) Appl. No.: 14/301,760

(22) Filed: Jun. 11, 2014

(65) Prior Publication Data
US 2015/0361260 A1 Dec. 17, 2015

(51) Int. Cl.
| B32B 27/08 | (2006.01) |
| C08L 69/00 | (2006.01) |
| C08J 3/00 | (2006.01) |
| C08J 3/20 | (2006.01) |
| C08K 5/42 | (2006.01) |
| C08K 5/523 | (2006.01) |
| C08L 27/12 | (2006.01) |
| C08L 79/08 | (2006.01) |
| C08L 83/04 | (2006.01) |
| C08K 3/013 | (2018.01) |

(52) U.S. Cl.
CPC ............ *C08L 69/00* (2013.01); *C08J 3/005* (2013.01); *C08J 3/203* (2013.01); *C08K 3/013* (2018.01); *C08K 5/42* (2013.01); *C08K 5/523* (2013.01); *C08L 27/12* (2013.01); *C08L 79/08* (2013.01); *C08L 83/04* (2013.01); *C08J 2369/00* (2013.01); *C08J 2425/12* (2013.01); *C08J 2427/18* (2013.01); *C08J 2479/08* (2013.01)

(58) Field of Classification Search
CPC .... C08L 69/00; C08L 666/02; C08L 2666/04; C08L 27/12; C08L 27/18; C08L 55/02; C08L 83/04; C08J 2369/00; C08J 5/18; C08K 3/0033; C08K 3/346; C08K 5/523
USPC ........................................................ 428/220
See application file for complete search history.

(56) References Cited

U.S. PATENT DOCUMENTS

| 4,208,489 A | 6/1980 | Schmidt et al. | |
| 4,438,231 A * | 3/1984 | Liu | C08K 5/42 |
| | | | 524/161 |
| 4,548,997 A * | 10/1985 | Mellinger | C08L 69/00 |
| | | | 525/425 |
| 4,558,141 A | 12/1985 | Squire | |
| 4,776,981 A | 10/1988 | Kress et al. | |
| 5,380,795 A | 1/1995 | Gosens et al. | |
| 6,031,036 A | 2/2000 | Rosenquist et al. | |
| 7,244,778 B2 * | 7/2007 | Choate | C08J 5/04 |
| | | | 524/395 |
| 7,317,067 B2 | 1/2008 | Ikeda et al. | |
| 7,695,815 B2 | 4/2010 | Agarwal et al. | |
| 7,732,516 B2 | 6/2010 | Shen et al. | |
| 8,691,902 B2 | 4/2014 | Grcev et al. | |
| 2005/0038145 A1 * | 2/2005 | Gallucci | C08K 7/04 |
| | | | 524/157 |
| 2005/0182165 A1 | 8/2005 | Ma et al. | |
| 2005/0250908 A1 | 11/2005 | Briers et al. | |
| 2006/0125143 A1 | 6/2006 | Donea et al. | |
| 2008/0299355 A1 | 12/2008 | Kurasawa | |
| 2009/0306258 A1 | 12/2009 | Siripurapu et al. | |
| 2011/0229704 A1 * | 9/2011 | Grcev | C08J 5/18 |
| | | | 428/220 |
| 2011/0245388 A1 | 10/2011 | Monden | |
| 2012/0065283 A1 | 3/2012 | Adjei et al. | |
| 2013/0108852 A1 * | 5/2013 | Kuhlman | C08G 73/1003 |
| | | | 428/220 |

FOREIGN PATENT DOCUMENTS

| EP | 1038920 A1 | 6/1999 |
| WO | 9410245 A1 | 5/1994 |
| WO | 2010077644 A1 | 7/2010 |

OTHER PUBLICATIONS

CompositesWorld, Engineered Fibers Technology announces new fiber products: Jun. 18, 2012.*
Arichem LLC, Flame Retardants STB-FRTM web archive: 2008.*
International Search Report for International Application No. PCT/IB2015/054481, International Filing Date Jun. 12, 2015, dated Sep. 9, 2015, 5 pages.
Written Opinion for International Application No. PCT/IB2015/054481, International Filing Date Jun. 12, 2015, dated Sep. 9, 2015, 6 pages.

* cited by examiner

*Primary Examiner* — Frank J Vineis
*Assistant Examiner* — Alicia J Sawdon
(74) *Attorney, Agent, or Firm* — Cantor Colburn LLP

(57) ABSTRACT

A thermoplastic composition comprising, based on the total weight of the thermoplastic composition: 40 to 80 wt. % of an aromatic polycarbonate; 10 to 40 wt. % of a reinforcing mineral filler; 0.05 to 1.5 wt. % of a fluorinated polymer; 10 to 35 wt. % of a polyetherimide; 0 to 1.5 wt. % of sodium trichlorobenzene sulphonate; optionally, 1 to 8 wt. % of an organic phosphorus-containing flame retardant; optionally, 0.05 to 20 wt. % of an impact modifier; and optionally, 0.05 to 5 wt. % of an additive composition comprising an antioxidant, a mold release agent, and a stabilizer.

17 Claims, No Drawings

POLYCARBONATE COMPOSITIONS, METHOD OF MANUFACTURE THEREOF, AND ARTICLES THEREFROM

BACKGROUND

The present disclosure is directed to polycarbonate compositions, manufacture of the compositions, articles containing the compositions, and methods of manufacture of the articles.

Polycarbonates are useful in a wide variety of applications at least in part because of their good balance of properties, such as moldability, heat resistance and impact properties among others. However, standards for flame spread, heat release, and smoke generation upon burning have become increasingly stringent, particularly in applications used in mass transportation (aircraft, trains, and ships), as well as building and construction. For example, the European Union has approved the introduction of a new harmonized fire standard for rail applications, namely EN-45545, to replace all currently active different standards in each member state. This standard will impose stringent requirements on flame spread, heat release and smoke density properties allowed for materials used in these applications.

One difficulty in developing materials that meet the stringent standards is that use of one component to improve one property, for example, flame retardance, can concomitantly degrade another selected property, such as smoke density. Accordingly, there remains a need in the art for polycarbonate compositions that have excellent flame spread, heat release, and smoke properties at the same time. It would be a further advantage if the compositions could be rendered flame retardant, low heat release and low smoke without a significant detrimental effect on one or more of material cost, processability, and mechanical properties.

SUMMARY

A thermoplastic composition comprising, based on the total weight of the thermoplastic composition: 40 to 80 wt. % of an aromatic polycarbonate; 10 to 40 wt. % of a reinforcing mineral filler; 0.05 to 1.5 wt. % of a fluorinated polymer; 10 to 35 wt. % of a polyetherimide; 0 to 1.5 wt. % of sodium trichlorobenzene sulphonate; optionally, 1 to 8 wt. % of an organic phosphorus-containing flame retardant; optionally, 0.05 to 20 wt. % of an impact modifier; and optionally, 0.05 to 5 wt. % of an additive composition comprising an antioxidant, a mold release agent, and a stabilizer.

In another embodiment, A thermoplastic composition comprises, based on the total weight of the composition, 40 to 60 wt. % of a bisphenol A polycarbonate; 15 to 25 wt. % of talc; 0.2 to 0.8 wt. % of the fluorinated polymer; 1 to 8 wt. % of an phosphorus-containing flame retardant comprising units derived from bisphenol A; 0 to 5 wt. % of a bulk acrylonitrile-butadiene-styrene; 0.1 to 5 wt. % of a silicone oil; 10 to 35 wt. % of the polyetherimide; 0 to 1.5 wt. % of the sodium trichlorobenzenesulfonate; and 0.1 to 2.5 wt. % of the additive composition comprising an antioxidant, a mold release agent, and a stabilizer.

In another embodiment, a method of forming the composition comprises combining the components of the composition thereof.

In yet another embodiment, an article comprises the above-described thermoplastic composition.

In still another embodiment, a method of manufacture of an article comprises molding, extruding, or shaping the above-described thermoplastic composition into an article.

The above described and other features are illustrated by the following detailed description and examples.

DETAILED DESCRIPTION

The inventors hereof have discovered that thermoplastic compositions having very low smoke density, low heat release as well as excellent flame retardant properties can unexpectedly be obtained by combining certain filler reinforced polycarbonate components with a polyetherimide or polyetherimide fiber. It has also been found that sodium trichlorobenzene sulphonate, when used together with a polyetherimide, provides further beneficial effects. For example, the thermoplastic compositions can have a smoke density (Ds-4) of less than 300 as determined in accordance with ISO 5659-2 on 3 mm plaques at 50 kW/m$^2$. The thermoplastic compositions can further have a heat release (MAHRE) of less than 90 kW/m$^2$ as determined in accordance with ISO 5660-1 on 3 mm plaques at 50 kW/m$^2$. In addition, the polycarbonate compositions can have a critical flux at extinguishment (CFE) of greater than 20 KW/m$^2$ as determined in accordance with ISO 5658-2 on 3 mm plaques. With this discovery, it is now possible to manufacture flame retardant compositions meeting all the requirements for hazard level two R1 applications according to the EN45545 (2013) norm.

The thermoplastic compositions can further have excellent impact strength. The thermoplastic compositions can also be formulated to have low melt viscosities, which renders them suitable for injection molding. The compositions can further have very low color, and in particular white compositions can be obtained. Such compositions are especially useful in the manufacture of large, low smoke, low heat release thermoplastic sheets that can be used, for example, in the manufacture of components in aircraft, train, marine, or other mass transportation applications, as well as components in high occupancy, low supervision structures.

The thermoplastic compositions comprise 10 to 35 wt. % of a polyetherimide, 0 to 1.5 wt. % of sodium trichlorobenzene sulphonate, 40 to 80 wt. % of an aromatic polycarbonate, 0.05 to 1.5 wt. % of a fluorinated polymer, and 10 to 40 wt. % of a reinforcing mineral filler. It has been found that the use of a polyetherimide, and optionally sodium trichlorobenzene sulphonate, in combination with the polycarbonate unexpectedly provides compositions having a combination of low smoke, low heat release, and excellent flame retardant properties.

"Polycarbonate" as used herein means a polymer having repeating structural carbonate units of formula (1)

in which at least 60 percent of the total number of R$^1$ groups contain aromatic moieties and the balance thereof are aliphatic, alicyclic, or aromatic. In an embodiment, each R$^1$ is a C$_{6-30}$ aromatic group, that is, contains at least one aromatic moiety. The polycarbonate having such repeating structural carbonate units is referred to as "aromatic polycarbonate." R$^1$ can be derived from an aromatic dihydroxy compound of the formula HO—R$^1$—OH, in particular of formula (2)

HO-A$^1$-Y$^1$-A$^2$-OH (2)

wherein each of A$^1$ and A$^2$ is a monocyclic divalent aromatic group and Y$^1$ is a single bond or a bridging group having one or more atoms that separate A$^1$ from A$^2$. In an embodiment, one atom separates A$^1$ from A$^2$. Specifically, each R$^1$ can be derived from a bisphenol of formula (3)

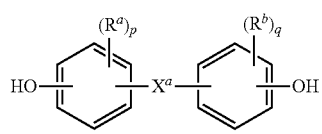

(3)

wherein R$^a$ and R$^b$ are each independently a halogen, C$_{1-12}$ alkoxy, or C$_{1-12}$ alkyl; and p and q are each independently integers of 0 to 4. It will be understood that when p or q is less than 4, the valence of each carbon of the ring is filled by hydrogen. Also in formula (3), X$^a$ is a bridging group connecting the two hydroxy-substituted aromatic groups, where the bridging group and the hydroxy substituent of each C$_6$ arylene group are disposed ortho, meta, or para (specifically para) to each other on the C$_6$ arylene group. In an embodiment, the bridging group X$^a$ is single bond, —O—, —S—, —S(O)—, —S(O)$_2$—, —C(O)—, or a C$_{1-18}$ organic group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. In an embodiment, p and q is each 1, and R$^a$ and R$^b$ are each a C$_{1-3}$ alkyl group, specifically methyl, disposed meta to the hydroxy group on each arylene group.

In an embodiment, X$^a$ is a substituted or unsubstituted C$_{3-18}$ cycloalkylidene, a C$_{1-25}$ alkylidene of formula —C(R$^c$)(R$^d$)— wherein R$^c$ and R$^d$ are each independently hydrogen, C$_{1-12}$ alkyl, C$_{1-12}$ cycloalkyl, C$_{7-12}$ arylalkyl, C$_{1-12}$ heteroalkyl, or cyclic C$_{7-12}$ heteroarylalkyl, or a group of the formula —C(=R$^e$)— wherein R$^e$ is a divalent C$_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In another embodiment, X$^a$ is a C$_{1-18}$ alkylene, a C$_{3-18}$ cycloalkylene, a fused C$_{6-18}$ cycloalkylene, or a group of the formula —B$^1$-G-B$^2$— wherein B$^1$ and B$^2$ are the same or different C$_{1-6}$ alkylene and G is a C$_{3-12}$ cycloalkylidene or a C$_{6-16}$ arylene. For example, X$^a$ can be a substituted C$_{3-18}$ cycloalkylidene of formula (4)

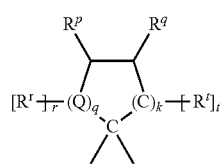

(4)

wherein R$^r$, R$^p$, R$^q$, And R$^t$ are each independently hydrogen, halogen, oxygen, or C$_{1-12}$ hydrocarbon groups; Q is a direct bond, a carbon, or a divalent oxygen, sulfur, or —N(Z)— where Z is hydrogen, halogen, hydroxy, C$_{1-12}$ alkyl, C$_{1-12}$ alkoxy, or C$_{1-12}$ acyl; r is 0 to 2, t is 1 or 2, q is 0 or 1, and k is 0 to 3, with the proviso that at least two of R$^r$, R$^p$, R$^q$, and R$^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., R$^q$ and R$^t$ taken together) form an aromatic group, and in another embodiment, R$^q$ and R$^t$ taken together form one aromatic group and R$^r$ and R$^p$ taken together form a second aromatic group. When R$^q$ and R$^t$ taken together form an aromatic group, R$^p$ can be a double-bonded oxygen atom, i.e., a ketone.

Bisphenols wherein X$^a$ is a cycloalkylidene of formula (4) can be used in the manufacture of polycarbonates containing phthalimidine carbonate units of formula (1a)

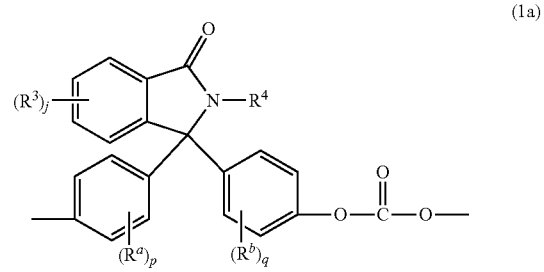

(1a)

wherein R$^a$, R$^b$, p, and q are as in formula (3), R$^3$ is each independently a C$_{1-6}$ alkyl, j is 0 to 4, and R$_4$ is hydrogen, C$_{1-6}$ alkyl, or a substituted or unsubstituted phenyl, for example a phenyl substituted with up to five C$_{1-6}$ alkyls. For example, the phthalimidine carbonate units are of formula (1b)

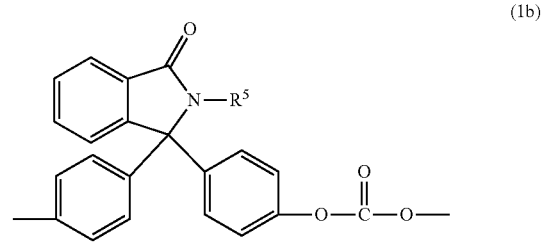

(1b)

wherein R$^5$ is hydrogen, phenyl optionally substituted with up to five 5 C$_{1-6}$ alkyls, or C$_{1-4}$ alkyl. In an embodiment in formula (1b), R$^5$ is hydrogen, methyl, or phenyl, specifically phenyl. Carbonate units (1b) wherein R$^5$ is phenyl can be derived from 2-phenyl-3,3'-bis(4-hydroxy phenyl)phthalimidine (also known as 3,3-bis(4-hydroxyphenyl)-2-phenylisoindolin-1-one, or N-phenyl phenolphthalein bisphenol ("PPPBP")).

Other bisphenol carbonate repeating units of this type are the isatin carbonate units of formula (1c) and (1d)

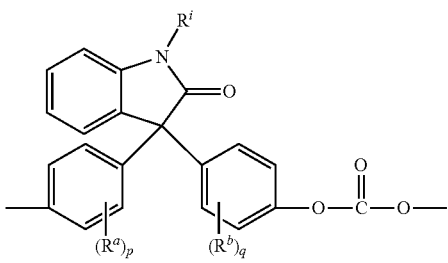

(1c)

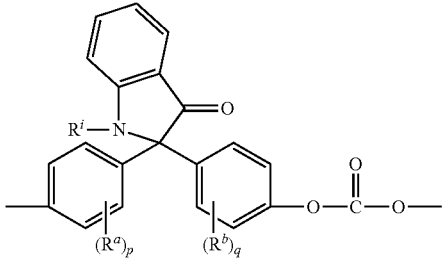

(1d)

wherein $R^a$ and $R^b$ are each independently $C_{1-12}$ alkyl, p and q are each independently 0 to 4, and $R^i$ is $C_{1-12}$ alkyl, phenyl, optionally substituted with 1 to 5 $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^i$ is $C_{1-4}$ alkyl or phenyl.

Other examples of bisphenol carbonate units derived from of bisphenols (3) wherein $X^a$ is a substituted or unsubstituted $C_{3-18}$ cycloalkylidene (4) include the cyclohexylidene-bridged, alkyl-substituted bisphenol of formula (1e)

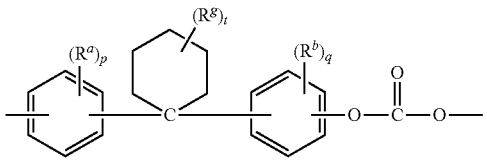

(1e)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, p and q are each 0 or 1, and t is 0 or 3, specifically 0.

Examples of other bisphenol carbonate units derived from bisphenol (3) wherein $X^a$ is a substituted or unsubstituted $C_{3-18}$ cycloalkylidene include adamantyl units of formula (1f) and fluorenyl units of formula (1g)

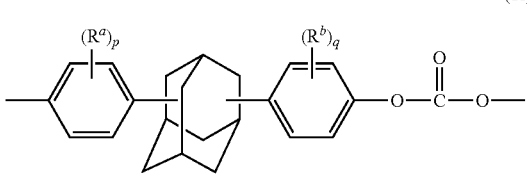

(1f)

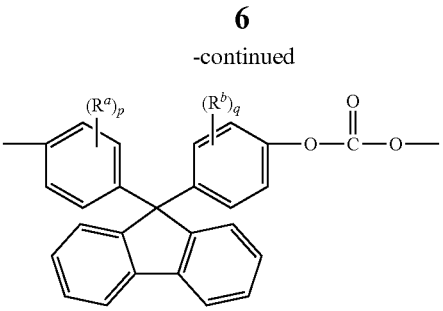

(1g)

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1; specifically, $R^a$, $R^b$ are each methyl, p and q are each 0 or 1, and when p and q are 1, the methyl group is disposed meta to the cycloalkylidene bridging group. Carbonates containing units (1a) to (1g) are useful for making polycarbonates with high glass transition temperatures (Tg) and high heat distortion temperatures.

Other useful dihydroxy compounds of the formula HO—$R^1$—OH include aromatic dihydroxy compounds of formula (6)

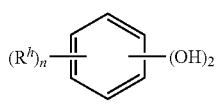

(6)

wherein each $R^h$ is independently a halogen atom, $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4. The halogen is usually bromine.

Some illustrative examples of specific dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4- hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxy-dibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis (4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In a specific embodiment, the polycarbonate is a linear homopolymer derived from bisphenol A, in which each of $A^1$ and $A^2$ is p-phenylene and $Y^1$ is isopropylidene in formula (3).

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

In an embodiment, the polycarbonate has flow properties useful for the manufacture of thin articles. Melt volume flow rate (often abbreviated MVR) measures the rate of extrusion of a thermoplastic through an orifice at a prescribed temperature and load. Polycarbonates useful for the formation of thin articles can have an MVR, measured at 260° C./5 kg, of 5 to 20 cubic centimeters per 10 minutes (cc/10 min), specifically 8 to 15 cc/10 min. Combinations of polycarbonates of different flow properties can be used to achieve the overall desired flow property.

"Polycarbonates" includes homopolycarbonates (wherein each $R^1$ in the polymer is the same), copolymers comprising different $R^1$ moieties in the carbonate ("copolycarbonates"), and copolymers comprising carbonate units and other types of polymer units, such as ester units or siloxane units.

Polycarbonates can be manufactured by processes such as interfacial polymerization and melt polymerization. Although the reaction conditions for interfacial polymerization can vary, an exemplary process generally involves dissolving or dispersing a dihydroxy compound in aqueous caustic NaOH or KOH, adding the resulting mixture to a water-immiscible solvent, and contacting the reactants with a carbonate precursor in the presence of a catalyst such as, for example, a tertiary amine or a phase transfer catalyst, under controlled pH conditions, e.g., 8 to 10.

The water-immiscible solvent can be, for example, methylene chloride, 1,2-dichloroethane, chlorobenzene, toluene, and the like.

Exemplary carbonate precursors include a carbonyl halide such as carbonyl bromide or carbonyl chloride (phosgene) a bishaloformate of a dihydroxy compound (e.g., the bischloroformate of bisphenol A, hydroquinone ethylene glycol, neopentyl glycol, or the like), and diaryl carbonates. Combinations comprising at least one of the foregoing types of carbonate precursors can also be used. The diaryl carbonate ester can be diphenyl carbonate, or an activated diphenyl carbonate having electron-withdrawing substituents on the each aryl, such as bis(4-nitrophenyl)carbonate, bis(2-chlorophenyl)carbonate, bis(4-chlorophenyl)carbonate, bis (methyl salicyl)carbonate, bis(4-methylcarboxylphenyl) carbonate, bis(2-acetylphenyl) carboxylate, bis(4-acetylphenyl) carboxylate, or a combination comprising at least one of the foregoing.

Among tertiary amines that can be used as catalysts in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is Cl$^-$, Br, a $C_{1-8}$ alkoxy or a $C_{6-18}$ aryloxy. An effective amount of a phase transfer catalyst can be 0.1 to 10 wt %, or 0.5 to 2 wt %, each based on the weight of dihydroxy compound in the phosgenation mixture.

Alternatively, melt processes can be used to make the polycarbonates. Generally, in the melt polymerization process, polycarbonates can be prepared by co-reacting, in a molten state, a dihydroxy reactant and a diaryl carbonate ester in the presence of a transesterification catalyst. The reaction can be carried out in typical polymerization equipment, such as a continuously stirred reactor (CSTR), plug flow reactor, wire wetting fall polymerizers, free fall polymerizers, wiped film polymerizers, BANBURY mixers, single or twin screw extruders, or a combination of the foregoing. Volatile monohydric phenol is removed from the molten reactants by distillation and the polymer is isolated as a molten residue. Melt polymerization can be conducted as a batch process or as a continuous process. In either case, the melt polymerization conditions used can comprise two or more distinct reaction stages, for example, a first reaction stage in which the starting dihydroxy aromatic compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of 1,000 to 7,500 Daltons. In one or more subsequent polymerization stages the number average molecular weight (Mn) of the polycarbonate is increased to between 8,000 and 25,000 Daltons (using polycarbonate standard). Typically, solvents are not used in the process, and the reactants dihydroxy aromatic compound and the diaryl carbonate are in a molten state. The reaction temperature can be 100° C. to 350° C., specifically 180° C. to 310° C. The pressure can be at atmospheric pressure, supra-atmospheric pressure, or a range of pressures from atmospheric pressure to 15 torr in the initial stages of the reaction, and at a reduced pressure at later stages, for example 0.2 to 15 torr. The reaction time is generally 0.1 hours to 10 hours.

Catalysts used in the melt transesterification polymerization production of polycarbonates can include alpha or beta catalysts. Beta catalysts are typically volatile and degrade at elevated temperatures. Beta catalysts are therefore preferred for use at early low-temperature polymerization stages. Alpha catalysts are typically more thermally stable and less volatile than beta catalysts.

The alpha catalyst can comprise a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of carbonate, such as $Cs_2CO_3$, $NaHCO_3$, and $Na_2CO_3$, and the like, non-volatile inorganic acid such as $NaH_2PO_3$, $NaH_2PO_4$, $Na_2HPO_3$, $KH_2PO_4$, $CsH_2PO_4$, $Cs_2HPO_4$, and the like, or mixed salts of phosphoric acid, such as $NaKHPO_4$, $CsNaHPO_4$, $CsKHPO_4$, and the like. Combinations comprising at least one of any of the foregoing catalysts can be used.

Possible beta catalysts can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl, a $C_{4-20}$ cycloalkyl, or a $C_{4-20}$ aryl; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used. The quaternary phosphonium compound can be a compound of the structure $(R^5)_4P^+X^-$, wherein each $R^5$ is the same or different, and is a $C_{1-20}$ alkyl, a $C_{4-20}$ cycloalkyl, or a $C_{4-20}$ aryl; and $X^-$ is an organic or inorganic anion, for example a hydroxide, phenoxide, halide, carboxylate such as acetate or formate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{20}$ to $R^{23}$ are each methyls and $X^-$ is carbonate, it is understood that $X^-$ represents $2(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used.

The amount of alpha and beta catalyst used can be based upon the total number of moles of dihydroxy compound used in the polymerization reaction. When referring to the ratio of beta catalyst, for example, a phosphonium salt, to all dihydroxy compounds used in the polymerization reaction, it is convenient to refer to moles of phosphonium salt per mole of the dihydroxy compound, meaning the number of moles of phosphonium salt divided by the sum of the moles of each individual dihydroxy compound present in the reaction mixture. The alpha catalyst can be used in an amount sufficient to provide $1 \times 10^{-2}$ to $1 \times 10^{-8}$ moles, specifically, $1 \times 10^{-4}$ to $1 \times 10^{-7}$ moles of metal per mole of the dihydroxy compounds used. The amount of beta catalyst (e.g., organic ammonium or phosphonium salts) can be $1 \times 10^{-2}$ to $1 \times 10^{-5}$, specifically $1 \times 10^{-3}$ to $1 \times 10^{-4}$ moles per total mole of the dihydroxy compounds in the reaction mixture. Quenching of the transesterification catalysts and any reactive catalysts residues with an acidic compound after polymerization is completed can also be useful in some melt polymerization processes. Removal of catalyst residues and/or quenching agent and other volatile residues from the melt polymerization reaction after polymerization is completed can also be useful in some melt polymerization processes.

An end-capping agent (also referred to as a chain stopper agent or chain terminating agent) can be included during polymerization to provide end groups. The end-capping agents (and thus end groups) are selected based on the desired properties of the polycarbonates. Exemplary end-capping agents are exemplified by monocyclic phenols such as phenol and $C_1$-$C_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, $C_1$-$C_{22}$ alkyl-substituted benzoyl chloride, toluoyl chloride, bromobenzoyl chloride, cinnamoyl chloride, and 4-nadimidobenzoyl chloride, polycyclic, monocarboxylic acid chlorides such as trimellitic anhydride chloride, and naphthoyl chloride, functionalized chlorides of aliphatic monocarboxylic acids, such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxyphenylethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt. %. Combinations comprising linear polycarbonates and branched polycarbonates can be used.

The thermoplastic composition further includes a fluoropolymer. "Fluoropolymers" as used herein include homopolymers and copolymers that comprise repeating units derived from a fluorinated alpha-olefin monomer, i.e., an alpha-olefin monomer that includes at least one fluorine atom substituent, and optionally, a non-fluorinated, ethylenically unsaturated monomer reactive with the fluorinated alpha-olefin monomer. Exemplary fluorinated alpha-olefin monomers include, but are not limited to, $CF_2=CF_2$, $CHF=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=CClF$, $CF_3CF=CF_2$, $CF_3CF=CHF$, $CF_3CH=CF_2$, $CF_3CH=CH_2$, $CF_3CF=CHF$, $CHF_2CH=CHF$, and $CF_3CH=CH_2$. Specifically, the fluorinated alpha-olefin monomer is one or more of tetrafluoroethylene ($CF_2=CF_2$), chlorotrifluoroethylene ($CClF=CF_2$), vinylidene fluoride ($CH_2=CF_2$), and hexafluoropropylene ($CF_2=CFCF_3$). Exemplary non-fluorinated monoethylenically unsaturated monomers include, but are not limited to, ethylene, propylene, butene, (meth)acrylate monomers such as methyl methacrylate and butyl acrylate, ethylenically unsaturated aromatic monomers such as styrene, vinyl ethers such as cyclohexyl vinyl ether, ethyl vinyl ether, and n-butyl vinyl ether, and vinyl esters such as vinyl acetate and vinyl versatate. Exemplary fluoropolymers include, but are not limited to, poly(tetrafluoroethylene) homopolymer (PTFE), poly(hexafluoroethylene), poly(tetrafluoroethylene-hexafluoroethylene), and poly(tetrafluoroethylene-ethylene-propylene). A specific exemplary fluoropolymer is PTFE, which can be fibril forming or non-fibril forming.

The fluoropolymer can be associated with, e.g., encapsulated by, another copolymer, for example a copolymer including units derived from the non-fluorinated ethylenically unsaturated monomers above and others. In some embodiments, the copolymer is a rigid copolymer such as styrene-acrylonitrile copolymer (SAN). PTFE encapsulated in SAN is known as TSAN. An exemplary TSAN includes 25 to 75 wt. %, specifically 50 wt. % PTFE and 25 to 75 wt. %, specifically 50 wt. % SAN, based on the total weight of the encapsulated fluoropolymer. The SAN can include, for example, 75 wt. % styrene and 25 wt. % acrylonitrile based on the total weight of the copolymer.

Another exemplary fluoropolymer is a fluoropolymer composition including 40 to 90 wt. % or 70 to 90 wt. % of a fibrillating fluoropolymer, specifically PTFE, and 10 to 60 wt. % or 10 to 30 wt. % of a thermoplastic, fluorinated polymer having a fluorinated backbone and a ratio of fluorine atoms to carbon atoms in the backbone of at least 1:1, specifically at least 1.5:1. Such compositions are described in US Publication 2005/0250908. The fibrillating fluoropolymer can be a homopolymer of tetrafluoroethylene or a copolymer thereof, for example a copolymer with another fluorinated comonomer such as chlorotrifluoroethylene, a perfluorinated vinyl ether such as perfluoromethyl vinyl ether, or a perfluorinated olefin such as hexafluoropropylene. Generally, the amount of the optional comonomers is not more than 1% so that the fluoropolymer conforms to the ISO 12086 standard defining non-melt processable PTFE. The fibrillating PTFE typically has an average particle size (number average) of not more than 10 micrometers, specifically 50 nm to 5 micrometers, for example between 100 nm and 1 micrometer. The fibrillating PTFE can be produced via aqueous emulsion polymerization.

Illustrative thermoplastic, fluorinated polymers having a fluorinated backbone include fluoropolymers containing copolymerized units derived from a fluorinated, ethylenically unsaturated monomer of the formula $RgCF=CR^g_2$, wherein each $R^g$ is independently H, F, Cl, $C_{1-8}$ alkyl, $C_{6-8}$ aryl, $C_{3-10}$ cycloalkyl, or $C_{1-8}$ perfluoroalkyl. In some embodiments, two or more monomers of the formula $R^gCF=CR^g_2$ are used. In some embodiments, each $R^g$ is independently $C_{1-3}$ alkyl. Representative examples of these fluorinated, ethylenically unsaturated monomers include, but are not limited to, vinylidene fluoride, tetrafluoroethylene, hexafluoropropylene, chlorotrifluoroethylene, 2-chloropentafluoropropene, dichlorodifluoroethylene, 1,1-dichlorofluoroethylene, and combinations including at least one of the foregoing fluorinated monomers. Perfluoro-1,3-dioxoles can also be used, as described in U.S. Pat. No. 4,558,141. These fluorinated, ethylenically unsaturated monomer(s) can be copolymerized with a nonfluorinated, ethylenically unsaturated comonomer of the formula $R^h_2C=CR^h_2$ wherein each $R^h$ is independently H, Cl, or a $C_{1-8}$ alkyl, a $C_{1-10}$ cycloalkyl, or $C_{6-8}$ aryl. In some embodiments, $R^h$ is a $C_{1-3}$ alkyl. Representative examples of nonfluorinated, ethylenically unsaturated comonomers include, but are not limited to, ethylene, propylene, and the like. Particular examples of thermoplastic, fluorinated polymers having a fluorinated backbone include, but are not limited to, polyvinylidene fluoride; fluoropolymers derived from the copolymerization of two or more different fluorinated monomers of the formula $R^gCF=CR^g_2$; and fluoropolymers derived from one or more fluorinated monomers of the formula $R^gCF=CR^g_2$ and one or more nonfluorinated monomers of the formula $R^h_2C=CR^h_2$, e.g., a terpolymer derived from one or more fluorinated monomers of the formula $R^gCF=CR^g_2$ and one or more nonfluorinated monomers of the formula $R^h_2C=CR^h_2$, specifically a terpolymer derived from two fluorinated monomers of the formula $RgCF=CR^g_2$ and one nonfluorinated monomer of the formula $R^h_2C=CR^h_2$. Specific exemplary thermoplastic, fluorinated polymers having a fluorinated backbone are derived from vinylidene fluoride and hexafluoropropylene; tetrafluoroethylene and at least 5 wt. % of hexafluoropropylene or a combination of hexafluoropropylene and vinylidene fluoride; or tetrafluoroethylene, hexafluoropropylene, and a non-fluorinated monomer of the formula $R^h_2C=CR^h_2$. The amount of thermoplastic, fluorinated polymers having a fluorinated backbone can be 10 to 60 wt. %, specifically 12 to 50 wt. %, more specifically 15 to 30 wt. %, based on the on the total weight of the thermoplastic, fluorinated polymers having a fluorinated backbone and the fibrillating fluoropolymer.

One fluoropolymer composition that can be used in the instant compositions is commercially available from 3M under the trade name 3M DYNEON-MM 5935EF, and is particularly effective for formulating compositions that can attain a combination of good flame retardance, low smoke density, and low heat release, when used together with the aromatic polycarbonate, polyetherimide, and optionally sodium trichlorobenzene sulphonate disclosed herein.

The thermoplastic composition further includes reinforcing mineral filler. Use of reinforcing mineral filler helps to prevent drips. Reinforcing mineral fillers include, but are not limited to, materials such as mica, clay (kaolin), talc, wollastonite, calcium carbonates (such as chalk, limestone, marble, and synthetic precipitated calcium carbonates), barium ferrite, heavy spar, and the like. Combinations of reinforcing mineral fillers can be used. Reinforcing mineral fillers can be in the form of plates or flakes having an aspect ratio (average diameter of a circle of the same area as the face of the plate to average thickness) of, e.g. 20 to 200; or needles or fibers having an aspect ratio (average length to average diameter) of, e.g., 5 to 500. The largest dimension of each particle (e.g., the diameter of a particle in the form of a flat plate) can be 0.1-10 micrometers, specifically 0.5 to 5 micrometers. The reinforcing mineral fillers can have an equivalent spherical diameter (based on volume) of 0.1 to 5 micrometers, specifically 0.01 to 3 micrometers.

It has been found that specific mineral fillers provide unexpected advantages, in particular mica, talc, and clay. However, it has been further found that lower smoke density is obtained when the reinforcing mineral filler is mica or talc, rather than clay. Accordingly, in some embodiments, the thermoplastic compositions include less than 20 wt. %, specifically less than 10 wt. %, more specifically less than 5 wt. % of clay as the mineral filler, based on the total weight of the thermoplastic compositions. In another embodiment, the thermoplastic compositions contain no clay.

Optionally, the thermoplastic composition can further include an impact modifier. Exemplary impact modifiers include, but are not limited to, natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, silicone oils, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), SAN, acrylonitrile-ethylene-propylene-diene-styrene (AES), styrene-isoprene-styrene (SIS), methyl methacrylate-butadiene-styrene (MBS), high rubber graft (HRG) ABS, and the like.

It has been found that use of certain impact modifiers adversely affects passing the most stringent flame, smoke, and/or heat release standards. Selection of the appropriate impact modifier is therefore important in achieving the optimum combination of flame retardance, low smoke density, low heat release, and good mechanical properties.

In a specific embodiment, the impact modifier is MBS or ABS, in particular bulk polymerized ABS. As is known in the art, ABS is a two-phase thermoplastic with SAN copolymer constituting the continuous phase (matrix). Additional SAN, or "free SAN" can further be added to various compositions as, for example, a flow modifier. "Free SAN" is to be distinguished from the matrix SAN present in the ABS that arises from the manufacture of the ABS. In some embodiments, the composition contains less than 6 wt. %, specifically less than 3 wt. % of free SAN, more specifically 0 wt. % of free SAN, based on the total weight of the composition.

The impact modifier can include less than 5 wt. %, specifically less than 2 wt. % of units derived from butadiene, based on the total weight of the impact modifier. The presence of higher amounts of butadiene can, in some compositions, increase smoke density.

The impact modifier can be an organopolysiloxane including siloxane units of formula (7)

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ arylalkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. Combinations of the foregoing R groups can be used in the same polymer.

The impact modifier can be a silicone oil, that is, an organopolysiloxane such as octamethylcyclotetrasiloxane, decamethylcyclopentasiloxane, polydimethylsiloxane, or polyphenylmethylsiloxane. Silicone oils are generally free of unsaturated groups, in particular ethylenically unsaturated groups. The silicone oils are fluid at 25° C. Exemplary silicone oils have a viscosity of 1 to 5,000 centistokes, specifically 100 to 2,500 centistokes, more specifically 500 to 1,500 centistokes, all at 25° C.

The organopolysiloxane can also be a polycarbonate-polysiloxane copolymer, also referred to as a polycarbonate-polysiloxane. Polycarbonate-polysiloxanes include blocks of carbonate repeat units of formula (1) in combination with blocks of siloxane repeat units of formula (7).

The number of siloxane repeat units in the blocks can vary widely depending on the type and relative amount of each component in the thermoplastic composition, the selected properties of the composition, and like considerations. Generally, the number of repeat units in the siloxane blocks has an average value of 2 to 1,000, specifically 2 to 500, more specifically 5 to 100. In some embodiments, the number of repeat units in the siloxane blocks has an average value of 10 to 75, and in still another embodiment, the number of repeat units in the siloxane blocks has an average value of 20 to 60, more specifically 25 to 35 or 40 to 50. Where the number of repeat units in the siloxane blocks is of a lower value, e.g., less than 40, it can be beneficial to use a relatively larger amount of the polycarbonate-polysiloxane. Conversely, where the number of repeat units in the siloxane blocks is of a higher value, e.g., greater than 40, a relatively lower amount of the polycarbonate-polysiloxane copolymer can be used.

In some embodiments, the siloxane blocks are of formula (8)

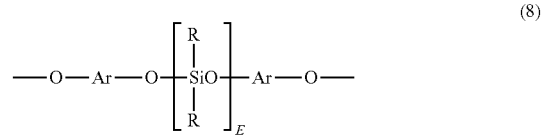

wherein E is the number of repeat units in the siloxane blocks as defined above; each R can be the same or different, and is as defined above; and Ar can be the same or different, and is a substituted or unsubstituted $C_6$-$C_{30}$ arylene group, wherein the bonds are directly connected to an aromatic moiety. The Ar groups in formula (8) can be derived from a $C_6$-$C_{30}$ dihydroxyarylene compound, for example a dihydroxy compound of formula (3) or (6) above. Exemplary dihydroxy compounds of formula (3) are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations including at least one of the foregoing dihydroxy compounds can also be used.

In another embodiment, the siloxane blocks are of formula (9)

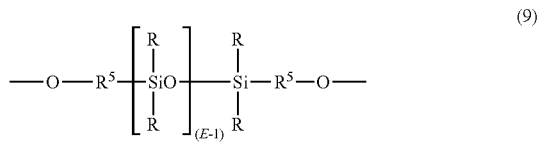

(9)

wherein R and E are as described above, and each $R^5$ is independently a divalent $C_1$-$C_{30}$ organic group, and wherein the polymerized polysiloxane unit is the reaction residue of its corresponding dihydroxy compound. In a specific embodiment, the siloxane blocks are of formula (10):

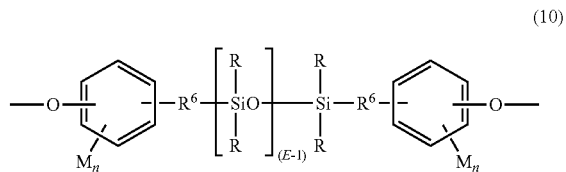

(10)

wherein R and E are as defined above. $R^6$ in formula (10) is a divalent $C_2$-$C_8$ aliphatic group. Each M in formula (10) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In some embodiments, M is bromo or chloro, an alkyl group such as methyl, ethyl, or propyl, an alkoxy group such as methoxy, ethoxy, or propoxy, or an aryl group such as phenyl, chlorophenyl, or tolyl; $R^6$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^6$ is a divalent $C_1$-$C_3$ aliphatic group, and R is methyl.

Blocks of formula (10) can be derived from the corresponding dihydroxy polysiloxane. Such dihydroxy polysiloxanes can be made by effecting a platinum-catalyzed addition between a siloxane hydride and an aliphatically unsaturated monohydric phenol. Exemplary aliphatically unsaturated monohydric phenols include, but are not limited to, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Combinations including at least one of the foregoing can also be used.

The polycarbonate-polysiloxane can include 50 to 99 wt. % of carbonate units and 1 to 50 wt. % siloxane units. Within this range, the polycarbonate-polysiloxane can include 70 to 98 wt. %, more specifically 75 to 97 wt. % of carbonate units and 2 to 30 wt. %, more specifically 3 to 25 wt. % siloxane units.

Polycarbonate-polysiloxanes can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The polycarbonate-polysiloxane can have a melt volume flow rate, measured at 300° C./1.2 kg, of 1 to 50 cubic centimeters per 10 minutes (cc/10 min), specifically 2 to 30 cc/10 min Mixtures of polycarbonate-polyorganosiloxanes of different flow properties can be used to achieve the overall selected flow property.

Polyetherimides in the thermoplastic compositions comprise more than 1, for example 10 to 1000 or 10 to 500 structural units, of formula (11)

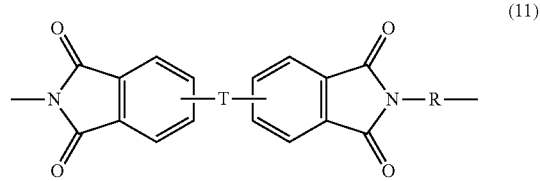

(11)

wherein each R is the same or different, and is a substituted or unsubstituted divalent organic group, such as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of formula (12)

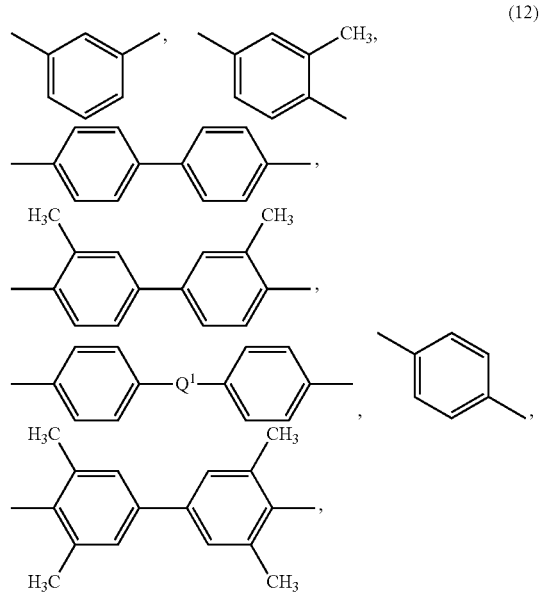

(12)

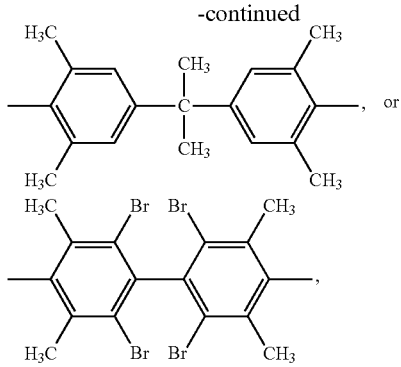

wherein $Q^1$ is —O—, —S—, —C(O)—, —SO$_2$—, —SO—, or —C$_y$H$_{2y}$— wherein y is an integer from 1 to 5 or a halogenated derivative thereof (which includes perfluoroalkylene groups). In an embodiment R is a m-phenylene or p-phenylene.

Further in formula (11), T is —O— or a group of the formula —O—Z—O— wherein the divalent bonds of the —O— or the —O—Z—O— group are in the 3,3',3,4',4,3', or the 4,4' positions. The group Z in formula (1) is the same or different, and is also a substituted or unsubstituted divalent organic group, and can be an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded. Exemplary groups Z include groups derived from a dihydroxy compound of formula (13):

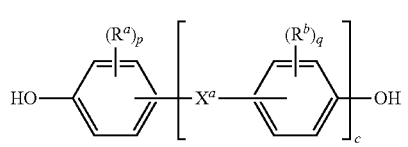

wherein $R^a$ and $R^b$ can be the same or different and are a halogen atom or a monovalent C$_{1-6}$ alkyl group; p and q are each independently integers of 0 to 4; c is 0 to 4; and $X^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group $X^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formulas (13a)

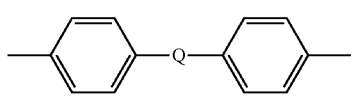

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is derived from bisphenol A wherein Q in formula (13a) is 2,2-isopropylidene.

In an embodiment in formula (11), R is m-phenylene or p-phenylene and T is —O—Z—O wherein Z is a divalent group of formula (13a). Alternatively, R is m-phenylene or p-phenylene and T is —O—Z—O wherein Z is a divalent group of formula (13a) and Q is 2,2-isopropylidene.

In some embodiments, the polyetherimide can be a copolymer, for example, a polyetherimide sulfone copolymer comprising structural units of formula (11) wherein at least 50 mole % of the R groups are of formula (12) wherein $Q^1$ is —SO$_2$— and the remaining R groups are independently p-phenylene or m-phenylene or a combination comprising at least one of the foregoing; and Z is 2,2-(4-phenylene) isopropylidene. Alternatively, the polyetherimide optionally comprises additional structural imide units, for example imide units of formula (14)

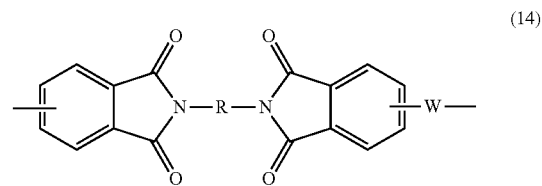

wherein R is as described in formula (11) and W is a linker of the formulas

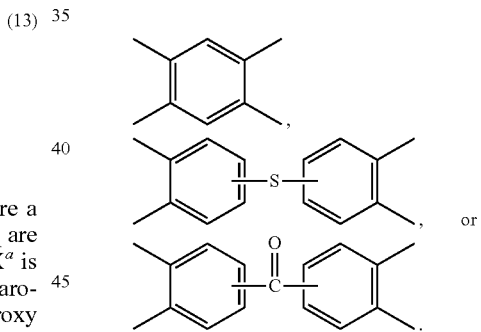

These additional structural imide units can be present in amounts from 0 to 10 mole % of the total number of units, specifically 0 to 5 mole %, more specifically 0 to 2 mole %. In an embodiment no additional imide units are present in the polyetherimide.

The polyetherimide can be prepared by any of the methods well known to those skilled in the art, including the reaction of an aromatic bis(ether anhydride) of formula (15)

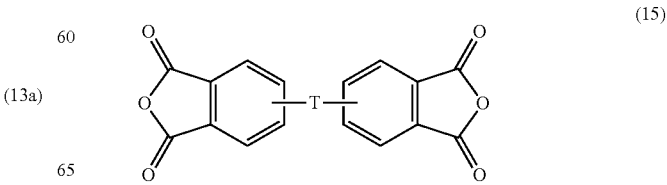

with an organic diamine of formula (16)

 (16)

wherein T and R are defined as described above. Copolymers of the polyetherimides can be manufactured using a combination of an aromatic bis(ether anhydride) of formula (4) and a different bis(anhydride), for example a bis(anhydride) wherein T does not contain an ether functionality, for example T is a sulfone.

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; and, 4-(2,3-dicarboxyphenoxy)-4'-(3,4-dicarboxyphenoxy)diphenyl sulfone dianhydride, as well as various combinations thereof.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone, and bis(4-aminophenyl) ether. Combinations of these compounds can also be used. In some embodiments the organic diamine is m-phenylenediamine, p-phenylenediamine, sulfonyl dianiline, or a combination comprising one or more of the foregoing.

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide polymer has a weight average molecular weight (Mw) of 1,000 to 150,000 grams/mole (Dalton), as measured by gel permeation chromatography, using polystyrene standards. In some embodiments the polyetherimide has an Mw of 10,000 to 80,000 Daltons. Such polyetherimide polymers typically have an intrinsic viscosity greater than 0.2 deciliters per gram (dl/g), or, more specifically, 0.35 to 0.7 dl/g as measured in m-cresol at 25° C.

In an embodiment, the polyetherimides comprise polyetherimide fibers. The polyetherimide fibers can be 5 to 75 millimeters (mm) in the longest dimension, specifically 6 to 60 mm, more specifically 7 to 50 mm, and still more specifically 10 to 40 mm in the longest dimension. An example of the polyetherimide fiber is "Ultem" manufactured by Sabic Innovative Plastics (limiting oxygen index (LOI): 32). This fiber has a tensile strength of about 3 cN/decitex.

One or more flame retardants can optionally be present in the thermoplastic composition. Useful flame retardants include, but are not limited to, organic compounds that include phosphorus, bromine, and/or chlorine. Non-brominated and non-chlorinated organic, phosphorus-containing flame retardants can be used in certain applications, for example organic phosphates and organic compounds containing phosphorus-nitrogen bonds.

In some embodiments the organic, phosphorus-containing flame retardant is an aromatic phosphate, for example triphenyl phosphate, tricresyl phosphate, isopropylated triphenyl phosphate, phenyl bis(dodecyl) phosphate, phenyl bis (neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri (nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Di- or polyfunctional aromatic phosphorus-containing compounds are also useful, for example resorcinol tetraphenyl diphosphate (RDP), the bis (diphenyl) phosphate of hydroquinone and the bis(diphenyl) phosphate of bisphenol A (BPADP), respectively, and their oligomeric and polymeric counterparts. Exemplary flame retardant compounds containing phosphorus-nitrogen bonds include, but are not limited to, phosphonitrilic chloride, phosphorus ester amides, phosphoric acid amides, phosphonic acid amides, phosphinic acid amides, and tris(aziridinyl) phosphine oxide.

When used, organic, phosphorus-containing flame retardants, in particular di- or polyfunctional aromatic phosphorus-containing flame retardants are present in amounts of 0.1 to 30 wt. %, specifically 1 to 20 wt. %, more specifically 1 to 8 wt. %, based on the total weight of the thermoplastic composition.

Halogenated materials can also be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other exemplary halogenated materials include, but are not limited to, 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. In some embodiments a metal synergist is not present.

When used, halogen-containing flame retardants are present in amounts of 0.5 to 30 wt. %, more specifically 1 to 25 wt. %, based on the total weight of the polymer component.

It has been found, however, that use of a halogenated flame retardant can result in higher smoke density. Accordingly, in some embodiments, no halogenated flame retardant is present in the thermoplastic compositions.

The flame retardant and/or thermoplastic composition can further be essentially free of chlorine and bromine Essentially free of chlorine and bromine as used herein means materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to 100 parts per million by weight (ppm), less than or equal to 75 ppm, or less than or equal to 50 ppm. When this definition is applied to the flame retardant it is based on the total weight of the flame retardant. When this definition is applied to the thermoplastic composition it is based on the total weight of the polymer component.

In addition to the polycarbonate, fluorinated polymer, impact modifier (if present), flame retardant (if present), and reinforcing mineral filler, the thermoplastic compositions can include various additives ordinarily incorporated into compositions of this type, with the proviso that the additive (s) are selected so as to not significantly adversely affect the selected properties of the thermoplastic composition, in particular low flame spread, low smoke density, and flame retardant properties. Such additives can be mixed at a suitable time during the mixing of the components for forming the composition. Exemplary additives include, but are not limited to, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, and radiation stabilizers. A combination of additives can be used, for example a combination of a heat stabilizer, mold release agent, and ultraviolet light stabilizer. In general, the individual additives are used in the amounts generally known to be effective, for example 0.01 to 5 wt. %, based on the total weight of the polymer component. In general, the total combined amount of the additives is 0.05 to 10 wt. %, specifically 0.05 to 5 wt. %, more specifically 0.1 to 2.5 wt % based on the total weight of the polymer component. In another embodiment fibrous reinforcing agents (e.g., glass fibers) are present in addition to the foregoing additives. When used, the fibrous reinforcing agents are present in amounts from 1 to 25 wt. %, specifically 10 to 20 wt. %, based on the total weight of the polymer component.

In some embodiments, the thermoplastic compositions optionally comprise 0.05 to 5 wt. % of an additive composition comprising an antioxidant, a mold release agent, and a stabilizer. The stabilizer can include a heat stabilizer, a light stabilizer, or a combination thereof.

In some embodiments, no additives other than the following specifically named additives are present in the composition.

Exemplary antioxidant additives include, but are not limited to, organophosphites such as tris(nonyl phenyl) phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid, or combinations including at least one of the foregoing antioxidants. Antioxidants are used in amounts of 0.01 to 0.1 wt. %, based on the total weight of the thermoplastic composition.

Exemplary heat stabilizer additives include, but are not limited to, organophosphites such as triphenyl phosphite, tris-(2,6-dimethylphenyl)phosphite, tris-(mixed mono- and di-nonylphenyl)phosphite; phosphonates such as dimethylbenzene phosphonate; phosphates such as trimethyl phosphate; and combinations including at least one of the foregoing heat stabilizers. Heat stabilizers are used in amounts of 0.01 to 0.1 wt. %, based on the total weight of the thermoplastic component.

Light stabilizers and/or ultraviolet light (UV) absorbing additives can also be used. Exemplary light stabilizer additives include, but are not limited to, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations including at least one of the foregoing light stabilizers. Light stabilizers are used in amounts of 0.01 to 5 wt. %, based on the total weight of the thermoplastic composition.

Exemplary UV absorbing additives include, but are not limited to, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethyl-butyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl]propane (UVINUL® 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers; or combinations including at least one of the foregoing UV absorbers. UV absorbers are used in amounts of 0.01 to 5 wt. %, based on the total weight of the thermoplastic composition.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl)isocyanurate; tristearin; poly-alpha-olefins; epoxidized soybean oil; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants including polyethylene glycol polymers, polypropylene glycol polymers, poly(ethylene glycol-co-propylene glycol) copolymers, or a combination including at least one of the foregoing glycol polymers, e.g., methyl stearate and polyethylene-polypropylene glycol copolymer in a solvent; and waxes such as beeswax, montan wax, and paraffin wax. Such materials are used in amounts of 0.1 to 1 wt. %, based on the total weight of the thermoplastic composition.

The relative amounts of each component in the thermoplastic compositions is an important factor in obtaining the selected levels of flame retardance, including low drip and low flame spread, together with low smoke density and low heat release, as well as advantageous physical properties such as ductility. As previously mentioned, use of one component for one advantageous purpose (e.g., a fluoropolymer) can unexpectedly result in adversely affecting another selected property, particularly when the amount of the component is lower or higher than disclosed herein.

In some embodiments, a thermoplastic composition wherein a sample of the thermoplastic composition has low smoke density, low heat release and flame retardance is achieved using, based on the total weight of the thermoplastic composition: 40 to 80 wt. % of an aromatic polycarbonate, 10 to 40 wt. % of a reinforcing mineral filler, 0.05 to 1.5 wt. % of a fluorinated polymer, 10 to 35 wt. % of a polyetherimide, 0 to 1.5 wt. % of sodium trichlorobenzene sulphonate, optionally, 0.05 to 20 wt. % of an impact modifier; optionally, 1 to 8 wt. % of an organic phosphorus-containing flame retardant, and optionally, 0.05 to 5 wt. % of an additive composition including an antioxidant, a mold release agent, and a stabilizer.

In another embodiment, a thermoplastic composition comprises, based on the total weight of the composition, 40 to 60 wt. % of a bisphenol A polycarbonate such as linear bisphenol A polycarbonate homopolymer; 15 to 25 wt. % of talc; 0.2 to 0.8 wt. % the fluorinated polymer such as polytetrafluoroethylene associated with a thermoplastic fluorinated polymer having a fluorinated backbone or a styrene-acrylonitrile copolymer; 1 to 8 wt. % or 2 to 6 wt. % of an phosphorus-containing flame retardant comprising units derived from bisphenol A; 0 to 5 wt. % or 1 to 4 wt. % of a bulk acrylonitrile-butadiene-styrene; 0.1 to 5 wt. % or 0.5 to 1.5 wt. % of a silicone oil; and 10 to 35 wt. % of a polyetherimide; 0 to 1.5 wt. % of sodium trichlorobenzenesulfonate; and 0.1 to 2.5 wt. %, 0.1 to 1 wt. %, or 0.5 to 1 wt. % of the additive composition comprising an antioxidant, a mold release agent, and a stabilizer.

In still another embodiment, a thermoplastic composition comprises, based on the total weight of the composition, 40 to 50 wt. % or 40 to 45 wt. % of a bisphenol A polycarbonate; 15 to 25 wt. % or 15 to 20 wt. % of talc; 0.2 to 0.8 wt. % of a fluorinated polymer; 1 to 8 wt. % or 2 to 6 wt. % of an phosphorus-containing flame retardant comprising units derived from bisphenol A; 0.5 to 5 wt. % or 1 to 4 wt. % of a bulk acrylonitrile-butadiene-styrene; 0.1 to 5 wt. % or 0.5 to 1.5 wt. % of a silicone oil; and 30 to 35 wt. % of a polyetherimide; and 0.1 to 2.5 wt. %, 0.1 to 1 wt. %, or 0.5 to 1 wt. % of the additive composition comprising an antioxidant, a mold release agent, a stabilizer, or a combination comprising at least one of the foregoing.

In yet another embodiment, a thermoplastic composition comprises, based on the total weight of the composition, 50 to 60 wt. % of a bisphenol A polycarbonate; 15 to 25 wt. % or 15 to 20 wt. % of talc; 0.2 to 0.8 wt. % of a fluorinated polymer for example a polytetrafluoroethylene associated with a thermoplastic fluorinated polymer having a fluorinated backbone or a styrene-acrylonitrile copolymer; 1 to 8 wt. % or 2 to 6 wt. % of an phosphorus-containing flame retardant comprising units derived from bisphenol A such as BPADP; 0.5 to 5 wt. % or 1 to 4 wt. % of a bulk acrylonitrile-butadiene-styrene; 0.1 to 5 wt. % or 0.5 to 1.5 wt. % of a silicone oil; 0.5 to 4 wt. % of $TiO_2$, 10 to 25 wt. % or 10 to 20 wt. % of a polyetherimide; and 0.1 to 2.5 wt. %, 0.1 to 1 wt. %, or 0.5 to 1 wt. % of the additive composition comprising an antioxidant, a mold release agent, a stabilizer, or a combination comprising at least one of the foregoing.

In still another embodiment, a thermoplastic composition comprises, based on the total weight of the composition, 50 to 60 wt. % of a bisphenol A polycarbonate; 15 to 25 wt. % or 15 to 20 wt. % of talc; 0.2 to 0.8 wt. % of a fluorinated polymer for example a polytetrafluoroethylene associated with a thermoplastic fluorinated polymer having a fluorinated backbone or a styrene-acrylonitrile copolymer; 1 to 8 wt. % or 2 to 6 wt. % of an phosphorus-containing flame retardant comprising units derived from bisphenol A such as BPADP; 0.5 to 5 wt. % or 1 to 4 wt. % of a bulk acrylonitrile-butadiene-styrene; 0.1 to 5 wt. % or 0.5 to 1.5 wt. % of a silicone oil; 10 to 25 wt. % or 10 to 20 wt. % of a polyetherimide fiber; and 0.1 to 2.5 wt. %, 0.1 to 1 wt. %, or 0.5 to 1 wt. % of the additive composition comprising an antioxidant, a mold release agent, a stabilizer, or a combination comprising at least one of the foregoing.

In yet another embodiment, a thermoplastic composition comprises, based on the total weight of the composition, 50 to 60 wt. % of a bisphenol A polycarbonate; 15 to 25 wt. % or 15 to 20 wt. % of talc; 0.2 to 0.8 wt. % of a fluorinated polymer for example a polytetrafluoroethylene associated with a thermoplastic fluorinated polymer having a fluorinated backbone or a styrene-acrylonitrile copolymer; 1 to 8 wt. % or 2 to 6 wt. % of an phosphorus-containing flame retardant comprising units derived from bisphenol A such as BPADP; 0 to 5 wt. % or 1 to 4 wt. % of a bulk acrylonitrile-butadiene-styrene; 0.1 to 5 wt. % or 0.5 to 1.5 wt. % of a silicone oil; 10 to 25 wt. % or 10 to 20 wt. % of a polyetherimide; 0.1 to 1.5 wt. % of the sodium trichlorobenzenesulfonate and 0.1 to 2.5 wt. %, 0.1 to 1 wt. %, or 0.5 to 1 wt. % of the additive composition comprising an antioxidant, a mold release agent, a stabilizer, or a combination comprising at least one of the foregoing.

A sample of any one or more of the above-described thermoplastic compositions can have a maximum average heat release (MAHRE) of equal to or less than 90 $kW/M^2$ when measured in accordance with ISO 5660-1 on a 3 or 4 mm thick plaque at 50 $kW/m^2$. Further, a sample of the thermoplastic composition has a smoke density after 4 minutes (Ds-4) of equal to or less than 300 measured in accordance with ISO 5659-2 on a 3 or 4 mm thick plaque at 50 $kW/m^2$. A sample also has a critical flux extinguishment of equal to or greater than 20 $kW/m^2$ measured in accordance with ISO 5658-2 on a 3 mm thick plaque.

A sample of the thermoplastic compositions can also an OSU integrated 2 minute heat release test value of less than 65 $kW\text{-}min/m^2$ and a peak heat release rate of less than 65 $kW/m^2$, each measured using the method of FAR F25.4, in accordance with FAR 25.853 (d) at a thickness of 1.5 mm or 3 mm.

The polycarbonate compositions can be manufactured by various methods. For example, powdered polycarbonate, fluoropolymer, and other components are first blended, optionally with fillers in a HENSCHEL® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a selected polymeric polymer and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as selected. Such pellets can be used for subsequent molding, shaping, or forming.

The polycarbonate compositions have excellent physical properties, including a melt volume ratio (MVR) of 5 to 20, more specifically 8 to 15 cm$^3$/10 minutes, measured at 260° C. under a load of 5 kg in accordance with ISO 1133.

The polycarbonate compositions can have a melt viscosity (MV) of 200 to 1000, more specifically 300 to 700 Pa·sec, measured at 280° C. at 500 sec$^{-1}$ in accordance with ISO 11443.

The polycarbonate compositions can further have a heat deflection temperature (HDT) of 100 to 140° C., more specifically 110 to 130° C., measured at 1.8 MPa according to ISO 75.

The polycarbonate compositions can further have a multi-axial impact (MAI) of 20 to 130 Joules (J), or 60 to 120 J, measured at 23° C. using 3.2 mm plaques in accordance with ISO 6603.

Shaped, formed, or molded articles including the thermoplastic compositions are also provided. Articles can be manufactured using a variety of processes, for example injection molding, extrusion, rotational molding, blow molding, and thermoforming Exemplary articles include, but are not limited to, those for transportation and construction applications, and include flat panels, thermoformed parts formed from sheets, and other structural components for trains, aircraft, buses, automobiles, and the like; and structural components for buildings such as hospitals, schools, and the like. In addition, the thermoplastic compositions can be used for applications such as computer and business machine housings (such as housings for monitors), handheld electronic device housings (such as housings for cell phones), electrical connectors, and components of lighting fixtures, ornaments, home appliances, roofs, greenhouses, sun rooms, swimming pool enclosures, and the like.

In a specific embodiment the thermoplastic compositions can be used to form sheets, for example sheets having a thickness from 0.1 to 10 mm, or 1 to 6 mm, or 1 to 4 mm, and preferably a flat sheet with low dripping and low smoke density index as described above. Such sheets are useful by themselves, or in combination with a substrate, and can be used in articles for the transportation and construction industry, such as in schools, hospitals, and the like.

The sheets can be formed by processes such as sheet extrusion, injection molding, gas-assist injection molding, extrusion molding, compression molding, blow molding, and combinations including at least one of the foregoing processes. Specific sheet extrusion processes include, but are not limited to, melt casting, blown sheet extrusion, and calendaring. Co-extrusion and lamination processes can be used to form multilayer sheets. The sheets can alternatively be prepared by casting a solution or suspension of the thermoplastic composition in a suitable solvent onto a substrate, belt, or roll, followed by removal of the solvent. Single or multiple layers of coatings can also be applied to the single or multilayer sheets to impart additional properties such as scratch resistance, ultra violet light resistance, aesthetic appeal, and the like. Coatings can be applied through standard application techniques such as rolling, spraying, dipping, brushing, flow coating, or combinations including at least one of the foregoing application techniques.

Oriented sheets can be prepared by blown sheet extrusion or by stretching cast or calendared sheets in the vicinity of the thermal deformation temperature using standard stretching techniques. For instance, a radial stretching pantograph can be used for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The thermoplastic compositions can also be used to form a multiwall sheet including a first sheet having a first side and a second side, wherein the first side of the first sheet is disposed upon a first side of a plurality of ribs; and a second sheet having a first side and a second side, wherein the first side of the second sheet is disposed upon a second side of the plurality of ribs, and where the first side of the plurality of ribs is opposed to the second side of the plurality of ribs. The first and/or the second sheets include the thermoplastic compositions.

The sheets and multiwall sheets can be thermoplastically processed into shaped articles via forming and molding processes such as thermoforming, vacuum forming, pressure forming, injection molding, and compression molding. Multilayered shaped articles can be formed by injection molding a thermoplastic composition onto a single or multilayer sheet by first providing a single or multilayer substrate, and optionally having one or more colors on a surface thereof, for instance, using screen printing or a transfer dye; conforming the substrate to a mold configuration such as by forming and trimming a substrate into a three dimensional shape and fitting the substrate into a mold having a surface that matches the three dimensional shape of the substrate; then injecting a thermoplastic composition into the mold cavity behind the substrate to (i) produce a one-piece permanently bonded three-dimensional product or (ii) transfer a pattern or aesthetic effect from the printed substrate to the injected composition, and removing the printed substrate, thus imparting the aesthetic effect to the molded composition. The substrate can include the polycarbonate compositions as described herein.

Curing and surface modification processes such as heat-setting, texturing, embossing, corona treatment, flame treatment, plasma treatment, and vacuum deposition can further be applied to the above articles to alter surface appearances and impart additional functionality to the articles.

In an embodiment, the thermoplastic compositions are formulated to provide articles that meet certain criteria set forth in the new European Railway standard EN-45545 (2013). The European Union has approved the introduction of a set of fire testing standards for the railroad industry that prescribes certain flammability, flame spread rate, heat release, smoke emission, and smoke toxicity requirements for materials used in railway vehicles, known as European Railway standard EN-45545 (2013). Based on the vehicle material, end-use, and fire risks, 26 different "Requirement"

categories for materials have been established (R1-R26). For example, interior components have been assigned Requirement levels R1-R3 as shown in Table 1A.

TABLE 1A

| Product No. | Name | Description | Requirement |
|---|---|---|---|
| IN1 | Interior components - horizontal downward facing surface; horizontal upwards facing; surfaces within cavities, walls - vertical surfaces | Interior components (structure and coverings) such as ceiling paneling as also flaps, boxes, hoods, louvers, insulation material and the body shell in this area. Interior components (structure and covering) such as side walls, front walls/end-walls, partitions, room dividers, as also flaps, boxes, hoods, louvers, in this area, interior doors, interior lining of the front-/end - wall doors and external doors, luggage compartment, windows (plastic, glazing with foils) also body shell in this area; kitchen interiors surfaces (except those of kitchen equipment) | R1 |
| IN2 | Limited surfaces | All listed products, which meet the requirements according 3.2.2 table of expression "limited surface" | R2 |
| IN3 | Strips | Vertical cover strips on walls, lighting diffuser, light covering, covering for lamps (lamps itself and signal lamps are not within the scope) | R3 |
| IN4 | Luggage storage areas | Overhead luggage racks, vertical luggage racks, luggage containers and luggage compartments | R1 |
| IN5 | Driver's desk | Paneling and surfaces of the driver's desk | R1 |
| IN6A | Interior surfaces of gangways Type A | Interior side of gangway membrane (below), interior lining of the gangway, (except flooring of the gangway) if there is no fire barrier at bulk-head sides of the gangway | R1 |
| IN6B | Interior surfaces of gangways Type B | Interior side of gangway membrane (bellow), interior lining of the gangway, (except flooring of the gangway), if there is a fire barrier at both bulk-head sides of the gangway | R6 |
| IN7 | Window frame | Window frame | R1 |
| IN8 | Curtains and sunblind in passenger and staff areas, staff compartments | Curtains and sunblind except where enclosed with a double glazed window | R1 |
| IN10A | Tables, folding tables top, including toilette wash basins | Upward surface of the tables or toilet wash basins and surrounds | R2 |
| IN10B | Tables, folding tables downward facing surface | Bottom surface of a table, the exposed vertical sides of drop down tables or any surface of a folding table that can become a bottom surface | R1 |

"Hazard Levels" (HL1 to HL3) have been designated, reflecting the degree of probability of personal injury as the result of a fire. The levels are based on dwell time and are related to operation and design categories. HL1 is the lowest hazard level and is typically applicable to vehicles that run under relatively safe conditions (easy evacuation of the vehicle). HL3 is the highest hazard level and represents most dangerous operation/design categories (difficult and/or time-consuming evacuation of the vehicle, e.g. in underground rail cars). For each application type, as illustrated in Table 1A, different test requirements for the hazard levels are defined. The testing methods, and smoke density (Ds-4), flame spread (CFE) and maximum heat release (MAHRE) values for the hazard level 2 in the European Railway standard EN-45545 (2013) are shown in Table 1B for R1 applications.

TABLE 1B

| European Railways Standard EN 45545 for R1 applications | | | |
|---|---|---|---|
| Hazard Level | Smoke Density, DS-4 ISO 5659-2 | Heat release, MAHRE (kW/m$^2$) ISO 5660-1 | Flame Spread CFE ISO 5658-2 |
| HL2 | <300 | <90 | >20 |

Data in the Examples shows that the compositions herein can meet the requirements for HL2 R1 applications.

Thus, while thermoplastic compositions can be used for the manufacture of a wide variety of articles, including high occupancy structures such as rail stations, airports and office buildings, the thermoplastic compositions are especially useful for the manufacture of transportation components.

As used herein, a "transportation component" is an article or portion of an article used in rolling stock, an aircraft, a roadway vehicle, or a marine vehicle. "Rolling stock" includes but is not limited to a locomotive, coach, light rail vehicle, underground rail vehicle, tram, trolley, magnetic levitation vehicle, and a cable car. An "aircraft" includes but is not limited to a jet, an airplane, an airship, a helicopter, a balloon, and a spacecraft. A "roadway vehicle" includes but is not limited to an automobile, bus, scooter and a motorcycle. A "marine vehicle" includes but is not limited to a boat, a ship (including freight and passenger ships), jet skis, and a submarine.

Exemplary transportation components for rolling stock (e.g. trains), aircraft, and roadway and marine vehicles, particularly rolling stock, includes interior components (e.g., structure and coverings) such as ceiling paneling, flaps, boxes, hoods, louvers, insulation material and the body shell in interiors, side walls, front walls/end walls, partitions, room dividers, interior doors, interior lining of the front-/end-wall doors and external doors, luggage overhead luggage racks, vertical luggage rack, luggage container, luggage compartments, windows, window frames, kitchen interiors, surfaces or a component assembly comprising at least one of the foregoing. In an embodiment any of the foregoing articles are in compliance with European Rail Standard EN-45545, for example meeting HL2.

The polycarbonate compositions are particularly useful in train and aircraft, for example a variety of aircraft compartment interior applications, as well as interior applications for other modes of transportation, such as bus, train, subway, marine, and the like. In a specific embodiment the articles are interior components for aircraft or trains, including access panels, access doors, air flow regulators baggage storage doors, display panels, display units, door handles, door pulls, enclosures for electronic devices, food carts, food trays, grilles, handles, magazine racks, seat components, partitions, refrigerator doors, seat backs, side walls, tray tables, trim panels, and the like. The polycarbonate compositions can be formed (e.g., molded) into sheets that can be used for any of the above mentioned components. It is generally noted that the overall size, shape, thickness, optical properties, and the like of the polycarbonate sheet can vary depending upon the desired application. In an embodiment any of the foregoing articles are in compliance with European Rail Standard EN-45545, for example meeting HL2. In a specific embodiment, the article is a ceiling, wall, seating, seat tray, seat back, cladding, and window surrounding.

The polycarbonate compositions are further illustrated by the following non-limiting examples.

EXAMPLES

The polycarbonate compositions described in the following examples were prepared from the components described in Table 2A.

TABLE 2A

|  | Description | Source |
|---|---|---|
| PC-1 | Linear bisphenol A (BPA) homopolycarbonate (interfacial polymerized); Mw = 35000 (polycarbonate standards) | SABIC |
| PC-2 | Linear bisphenol A homopolycarbonate (interfacial polymerized); Mw = 30000 (polycarbonate standards) | SABIC |
| SAN | Styrene-Acrylonitrile copolymer with an acrylonitrile content of about 15-35%, MFR (220° C./1.2 kg) of 18-24 g/10 min (trade name PolySAN 2537). | SABIC |
| PC-Si | PDMS (polydimethylsiloxane) - Bisphenol A copolymer, 20 mol % siloxane, Mw about 22,000 g/mol, interfacial polymerization | SABIC |
| ABS | Emulsion polymerized ABS including about 52 weight % polybutadiene, 12 weight % acrylonitrile, 36 weight % styrene | SABIC |
| BABS | Bulk polymerized ABS including about 15 weight % polybutadiene, 15 weight % acrylonitrile, 69 weight % styrene | SABIC |
| Silicone oil | PDMS silicone oil (1000 cps) (trade name Baysilone Fluid M1000) | Momentive Performance Materials |
| BPADP | Bisphenol A diphosphate (NcendX ® P-30) | Albemarle |
| Talc | LUZENAC fine talc (magnesium silicate hydrate), LUZENAC grade Jetfine 3CA. The talc is treated with a 45% $H_3PO_3$ solution in water from Quaron (3 wt. % based on the total weight of talc (e.g., 25 g of talc is treated with 0.75 g of acid solution) | Luzenac |
| $TiO_2$ | Titanium dioxide (trade name Kronos 2450) | Kronos |
| Coated $TiO_2$ | Coated titanium dioxide | Millennium |
| TSAN | PTFE encapsulated in SAN (50/50 weight %/weight %) | SABIC |
| Co-PTFE | Composition including 70 wt % PTFE and 30 wt. % of a terpolymer (trade name 3M ® MM 5935 EF) | 3M |
| STB | Sodium trichlorobenzene sulphonate | Arichem |
| PEI | Polyetherimide made via reaction of bisphenol-A dianhydride with equimolar amount of m-phenylene diamine, Mw = 31,000 to 35,000 g/mol (determined via GPC using polystyrene standards) | SABIC |
| PEI fibers | ULTEM fibers | SABIC |

The test standards shown in Table 2B were used in evaluation of the Examples.

TABLE 2B

| Description | Test | Specimen | Property | Units |
|---|---|---|---|---|
| ISO Smoke density | ISO 5659-2 | plaque 75 × 75 × 3 or 4 mm | DS-4 | [—] |
| ISO Heat release | ISO 5660-1 | plaque 100 × 100 × 3 or 4 mm | MAHRE | kW/m$^2$ |
| ISO Critical flux at extinguishment (Spread of Flame) | ISO 5658-2 | Plaque 800 × 155 × 3 or 4 mm | CFE | KW/m$^2$ |
| Peak Heat Release | FAR part 25.853 (d) | plaque 150 × 150 mm × 3 or 4 mm | Peak heat release | KW/m$^2$ |
| Heat Release at 2 min | FAR part 25.853 (d) | plaque 150 × 150 mm × 3 or 4 mm | Heat release at 2 min | KW · min/m$^2$ |

Examples 1-13

Examples 4-6 and 9-13 were formulated using varying amounts of PEI or PEI fibers. Examples 1-3, 7 and 8 were formulated without either PEI or PEI fibers. Results are shown in Table 3.

The data in Table 3 show that without PEI or PEI fibers, none of the compositions of Examples 1-3, 7 or 8 comply with EN45545 R1 hazard lever 2 requirements for all of flame spread, smoke, and heat release properties. Addition of PEI improves heat release and fire spread properties. The use of 30% of PEI results in compositions having flame spread (CFE), heat release (MAHRE) and smoke density (Ds-4) values meeting the thresholds for EN45545 R1 hazard level 2 qualification applications (CFE>20, MAHRE<90, and Ds-4<300). The improvement on the heat release and fire spread properties with the addition of 5% or 15% of PEI is less significant.

The presence of 15% of PEI fibers shows a greater improvement on fire spread and heat release properties as compared to 15% PEI. For example, CFE is improved from 18.6 to 23, and heat release improves from 60 to 33 when 15% PEI fibers are used as compared to when 15% PEI is used. Example 13 illustrates a PEI fiber-containing composition having all of heat release, fire spread and smoke density values meeting the requirements for EN45545 hazard level 2 R1 applications.

Examples 14-28

The Examples shown in Table 4 were either formulated with varying amounts of PEI, PEI fibers or without either PEI or PEI fibers. Results are shown in Table 4.

The results in Table 4 again shows that compositions having no PEI or PEI fibers do not comply with EN45545 R1 hazard lever 2 requirements for all of flame spread, smoke, and heat release properties. Addition of 15% of PEI together with 0.5% of STB improves the heat release and flame spread properties of the compositions, and resulted in compositions having flame spread (CFE), heat release (MAHRE) and smoke density (Ds-4) values meeting the requirements for EN45545 R1 hazard level 2 qualification applications (CFE>20, MAHRE<90, and Ds-4<300).

TABLE 3

| Component | Units | 1* | 2* | 3* | 4* | 5 | 6 | 7* | 8* | 9 | 10 | 11 | 12 | 13 |
|---|---|---|---|---|---|---|---|---|---|---|---|---|---|---|
| PC1 | wt % | 73.5 | | | 68.5 | 58.5 | 43.5 | 67.5 | 64.5 | 56.5 | 52.5 | 49.5 | 52.5 | 58.5 |
| PC2 | wt % | | 73.7 | 73.7 | | | | | | | | | | |
| Coated TiO$_2$ | wt % | | | | | | | 6 | 9 | 2 | 6 | 9 | | |
| Uncoated TiO$_2$ | wt % | | | | | | | | | | | | 6 | |
| Co-PTFE | wt % | 0.5 | 0.3 | | 0.5 | 0.5 | 0.5 | 0.5 | 0.5 | 0.5 | 0.5 | 0.5 | 0.5 | 0.5 |
| TSAN | wt % | | | 0.3 | | | | | | | | | | |
| BABS | wt % | 2.4 | 2.4 | 2.4 | 2.4 | 2.4 | 2.4 | 2.4 | 2.4 | 2.4 | 2.4 | 2.4 | 2.4 | 2.4 |
| BPADP | wt % | 4 | 4 | 4 | 4 | 4 | 4 | 4 | 4 | 4 | 4 | 4 | 4 | 4 |
| Talc | Wt. % | 18 | 18 | 18 | 18 | 18 | 18 | 18 | 18 | 18 | 18 | 18 | 18 | 18 |
| Silicon oil | wt % | 1 | 1 | 1 | 1 | 1 | 1 | 1 | 1 | 1 | 1 | 1 | 1 | 1 |
| Additives | wt % | 0.6 | 0.6 | 0.6 | 0.6 | 0.6 | 0.6 | 0.6 | 0.6 | 0.6 | 0.6 | 0.6 | 0.6 | 0.6 |
| PEI | wt % | | | | 5 | 15 | 30 | | | | 15 | 15 | 15 | 15 |
| PEI Fibers | wt % | | | | | | | | | | | | | 15 |
| TOTAL | wt. % | 100 | 100 | 100 | 100 | 100 | 100 | 100 | 100 | 100 | 100 | 100 | 100 | 100 |
| Properties | Thickness of testing sample | E | M | E | M | M | M | | | M | M | | | M |
| CFE (R1 HL-2 >20) | 3 mm | 17.3 | 15.2 | 13.1 | 20.8 | 18.6 | 26.4 | | | 20.7 | 19.6 | | / | 23 |
| | 4 mm | 15 | | | | 18 | | 18 | 18 | | 19 | 22 | / | |
| MAHRE (R1 HL-2 <90) | 3 mm | 63 | 135.2/130.8 | 97 | 82.5/89.6 | 54.5/56.5 | 36.7/42.4 | | | 53.2/49.5 | 59.9/64.9 | | 90 | 33.3 |
| | 4 mm | 125 | | | | 60 | | 152 | 152 | | 120 | 100 | 76 | |
| Ds-4 (R1 HL-2 <300) | 3 mm | 208 | 328/498 | 150/173 | 265/252 | 189/154 | 193/202 | | | 218/161 | 155/172 | | 308 | 161 |
| | 4 mm | 241 | | | | 119 | | 372 | 296 | | 159 | 199 | 238 | |

*Comparative example
M: Molded
E: Extruded Additives include antioxidant, mold release agent, or stabilizer

TABLE 4

| Component | Units | 14* | 15* | 16* | 17* | 18* | 19 | 20 | 21 | 22* | 23* | 24* | 25* | 26* | 27 | 28 |
|---|---|---|---|---|---|---|---|---|---|---|---|---|---|---|---|---|
| PC1 | wt % | 73 | 75.9 | 75.9 | 75.9 | 75.4 | 58 | 58 | 57.5 | 70.9 | 70.4 | 70.9 | 65.9 | 65.4 | 55.9 | 55.4 |
| Co-PTFE | wt % | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| TSAN | wt % | | | | | | | | | | | | | | | |
| BABS | wt % | 2.4 | | | | | 2.4 | 2.4 | 2.4 | | | | | | | |
| PC-Si | wt % | | | | | | | | | | | 5 | 5 | 5 | 5 | 5 |

TABLE 4-continued

| Component | Units | 14* | 15* | 16* | 17* | 18* | 19 | 20 | 21 | 22* | 23* | 24* | 25* | 26* | 27 | 28 |
|---|---|---|---|---|---|---|---|---|---|---|---|---|---|---|---|---|
| BPADP | wt % | 4 | 4 | 4 | 4 | 4 | 4 | 4 | 4 | 4 | 4 | 4 | 4 | 4 | 4 | 4 |
| Talc | Wt. % | 18 | 18 | 18 | 18 | 18 | 18 | 18 | 18 | 18 | 18 | 18 | 18 | 18 | 18 | 18 |
| Silicon oil | wt % | 1 | 1 | 1 | 1 | 1 | 1 | 1 | 1 | 1 | 1 | 1 | 1 | 1 | 1 | 1 |
| Additives | wt % | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| PEI | wt % | | | | | | 15 | 15 | 15 | 5 | 5 | | 5 | 5 | 15 | 15 |
| STB | wt % | 0.5 | | | | 0.5 | 0.5 | 0.5 | 1 | | 0.5 | | | 0.5 | | 0.5 |
| TOTAL | wt. % | 100 | 100 | 100 | 100 | 100 | 100 | 100 | 100 | 100 | 100 | 100 | 100 | 100 | | |
| Properties | | M | M | M | E | M | M | M | M | E | E | E | E | E | E | E |
| CFE (R1 HL-2 >20) | 3 mm | 11 | 19.7 | 21.5 | / | 19.6 | 20.7 | 21.05 | 19.6 | / | / | / | 19.8 | 13.1 | / | 13.1 |
| | 4 mm | | | | | | | 20 | | | | | | | | |
| MAHRE (R1 HL-2 <90) | 3 mm | 119.2/122.9 | 104.8/75.9 | 93 | 94 | 124/109.1 | 60.1/53.6 | 40.6 | 58.8/60.7 | 75 | 84 | 65 | 51 | 57 | 50 | 78 |
| | 4 mm | | | | | | | / | | | | | | | | |
| Ds-4 (R1 HL-2 <300) | 3 mm | 261/257 | 307/418 | 254 | 189/208 | 274/266 | 196/219 | 196 | 147/176 | 160/54 | 149/170 | 131/115 | 107/113 | 172/172 | 170/220 | 172/218 |
| | 4 mm | | | | | | | 210 | | | | | | | | |

*Comparative example
M: Molded
E: Extruded
Additives include antioxidant, mold release agent, or stabilizer Examples 29-31

Examples 29-31 were formulated without PEI or with PEI or PEI/STB combination. Peak heat release and heat release at 2 minutes were measure and the results are shown in Table 5.

TABLE 5

| Component | Units | 29 | 30 | 31* |
|---|---|---|---|---|
| PC1 | wt % | 58.24 | 57.74 | 73.24 |
| Talc | wt % | 18 | 18 | 18 |
| Co-PTFE | wt % | 0.5 | 0.5 | 0.5 |
| BABS | wt % | 2.4 | 2.4 | 2.4 |
| BPADP | wt % | 4 | 4 | 4 |
| Silicon oil | wt % | 1 | 1 | 1 |
| Additives | wt % | 0.86 | 0.86 | 0.86 |
| PEI | wt % | 15 | 15 | |
| STB | wt % | | 0.5 | |
| Total | wt. % | 100 | 100 | 100 |
| Properties | Thickness of testing sample | | | |
| Peak Heat Release | 3 mm | 69 | 62 | 90 |
| | 4 mm | 58 | | |
| Heat Release at 2 Min | 3 mm | 28 | 30 | 45 |
| | 4 mm | 15 | | |

*Comparative example
Additives include antioxidant, mold release agent, or stabilizer Comparative Example 31 shows that the composition without PEI has a peak heat release of 90 KW/m$^2$ and a heat release at 2 min of 45 KW·MIN/m$^2$. When the composition contains 15% PEI, peak heat release is improved from 90 KW/m$^2$ to 69 KW/m$^2$ and heat release at 2 min is improved from 45 KW·MIN/m$^2$ to 28 KW·MIN/m$^2$ for a 3 mm thick sample (Example 29). When the composition contains 15 wt. % of PEI and 0.5 wt. % of STB, peak heat release is further improved to 62 KW/m$^2$ for a 3 mm thick sample (Example 30). The use of PEI/STB combination leads to compositions (Example 30) that pass the stringent Aircraft OSU65/65 BSS7322 norm (peak heat release <65 KW/m$^2$ and heat release at 2 min<65 KW·MIN/m$^2$).

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs. As used herein, a "combination" is inclusive of blends, mixtures, alloys, reaction products, and the like.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; C1-6 or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety.

While the disclosed embodiments have been described with reference to an exemplary embodiment, it will be understood by those skilled in the art that various changes can be made and equivalents can be substituted for elements thereof without departing from the scope of that disclosed. In addition, many modifications can be made to adapt a particular situation or material to the disclosure without departing from the essential scope thereof. Therefore, it is intended that the disclosure not be limited to the particular embodiment disclosed as the best mode contemplated, but that the disclosed embodiments will include all embodiments falling within the scope of the appended claims.

What is claimed is:

1. A thermoplastic composition comprising, based on the total weight of the thermoplastic composition:
   40 to less than 80 wt. % of a linear bisphenol A polycarbonate homopolymer;
   10 to 40 wt. % of a reinforcing mineral filler comprising talc, mica, or a combination thereof;
   0.05 to 1.5 wt. % of a fluorinated polymer;
   10 to 20 wt. % of a polyetherimide fiber;
   1 to 8 wt. % of an organic phosphorus-containing flame retardant;
   0.05 to 20 wt. % of an impact modifier; and
   0.05 to 5 wt. % of an additive composition comprising an antioxidant, a mold release agent, and a stabilizer,
   wherein the thermoplastic composition does not contain sodium trichlorobenzene sulphonate and the thermoplastic composition does not contain any glass fibers, and
   a sample of the thermoplastic composition has
   a maximum average heat release (MAHRE) of equal to or less than 90 kW/m² measured in accordance with ISO 5660-1 on a 3 mm thick plaque at 50 kW/m²,
   a smoke density after 4 minutes (Ds-4) of equal to or less than 300 measured in accordance with ISO 5659-2 on a 3 mm thick plaque at 50 kW/m², and
   a critical flux extinguishment (CFE) of equal to or greater than 20 kW/m² measured in accordance with ISO 5658-2 on a 3 mm thick plaque.

2. The composition of claim 1, wherein the fluorinated polymer is polytetrafluoroethylene optionally associated with a thermoplastic fluorinated polymer having a fluorinated backbone or a styrene-acrylonitrile copolymer.

3. The composition of claim 1, wherein the impact modifier comprises from 1 to 20 wt. % of a polycarbonate-polysiloxane impact modifier, based on the total weight of the composition.

4. The composition of claim 1, wherein the impact modifier comprises 0.1 to 5 wt. % of a silicone oil impact modifier, based on the total weight of the composition.

5. The thermoplastic composition of claim 4, wherein the silicone oil comprises octamethylcyclotetrasiloxane, decamethylcyclopentasiloxane, polydimethylsiloxane, or polyphenylmethylsiloxane, or a combination comprising at least one of the foregoing.

6. The thermoplastic composition of claim 1, wherein the impact modifier comprises silicon oil and a bulk acrylonitrile-butadiene-styrene.

7. The thermoplastic composition of claim 1, wherein the organic phosphorus-containing flame retardant comprises units derived from bisphenol A.

8. The thermoplastic composition of claim 1, further comprising titanium dioxide.

9. The thermoplastic composition of claim 1, wherein:
   the linear bisphenol A polycarbonate homopolymer is present in an amount of 50 wt. % to 60 wt. %;
   the reinforcing mineral filler comprises 15 wt. % to 20 wt. % of talc;
   the fluorinated polymer is present in an amount of 0.2 wt. % to 0.8 wt. % the fluorinated polymer being a polytetrafluoroethylene associated with a thermoplastic fluorinated polymer having a fluorinated backbone or a styrene-acrylonitrile copolymer;
   the impact modifier comprises 0.1 wt. % to 5 wt. % of a silicon oil and 0.5 wt. % to 5 wt. % of a bulk acrylonitrile-butadiene-styrene; and
   the phosphorus-containing flame retardant is present in the composition in an amount of 2 to 6 wt. % and comprises units derived from bisphenol A, and
   the additive is present in an amount of 0.1 to 2.5 wt. %,
   each based on the total weight of the thermoplastic composition.

10. The thermoplastic composition of claim 9, wherein the impact modifier comprises 1 to 4 wt. % of the bulk acrylonitrile-butadiene-styrene and 0.5 to 1.5 wt. % of the silicone oil, each based on the total weight of the thermoplastic composition.

11. The thermoplastic composition of claim 9, wherein the polyetherimide comprises 10 to 500 structural units of formula (11)

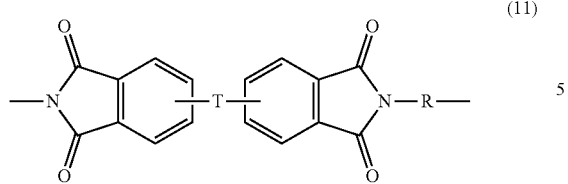

(11)

wherein R is m-phenylene or p-phenylene; and
T is —O—Z—O—;
wherein Z is a divalent group of formula (13a)

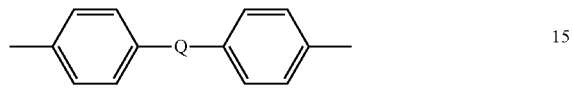

and Q is 2,2-isopropylidene.

12. An article comprising the composition of claim 1.

13. The article of claim 12, wherein the article is a sheet having a thickness of 0.1 mm to 10 mm.

14. The article of claim 12, wherein the reinforcing mineral filler is talc, and no clay is present.

15. The article of claim 12, in the form of an interior component for a train, or airplane.

16. The article of claim 15, wherein the interior component is a ceiling, wall, seating, seat tray, seat back, cladding, and window surrounding.

17. A method for the manufacture of an article, comprising molding, extruding, or shaping the composition of claim 1.

* * * * *